(12) United States Patent
Fourney

(10) Patent No.: US 9,073,704 B2
(45) Date of Patent: Jul. 7, 2015

(54) CONVEYOR EMPLOYING A VACUUM

(71) Applicant: Laitram, L.L.C., Harahan, LA (US)

(72) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 22 days.

(21) Appl. No.: 14/021,018

(22) Filed: Sep. 9, 2013

(65) Prior Publication Data
US 2015/0068866 A1 Mar. 12, 2015

(51) Int. Cl.
*B65G 17/24* (2006.01)
*B65G 39/20* (2006.01)
*B65G 47/46* (2006.01)
*B65G 51/00* (2006.01)
*B65G 47/54* (2006.01)
*B65G 17/00* (2006.01)

(52) U.S. Cl.
CPC ............... *B65G 47/46* (2013.01); *B65G 51/00* (2013.01); *B65G 17/24* (2013.01); *B65G 47/54* (2013.01); *B65G 39/20* (2013.01); *B65G 17/005* (2013.01)

(58) Field of Classification Search
CPC ...... B65G 39/20; B65G 17/24; B65G 17/005; B65G 47/54; B65G 13/02
USPC .......... 198/689.1, 779, 890.1, 370.03, 370.09
See application file for complete search history.

(56) References Cited

U.S. PATENT DOCUMENTS

| | | | | |
|---|---|---|---|---|
| 3,889,801 A | * | 6/1975 | Boyer | 198/689.1 |
| 5,305,869 A | * | 4/1994 | Damkjaer | 198/689.1 |
| 5,373,933 A | * | 12/1994 | Planke et al. | 198/689.1 |
| 6,164,431 A | * | 12/2000 | Morisod | 198/415 |
| 6,216,848 B1 | * | 4/2001 | Zens | 198/689.1 |
| 6,494,312 B2 | | 12/2002 | Costanzo | |
| 6,968,941 B2 | | 11/2005 | Fourney | |
| 7,461,739 B2 | | 12/2008 | Fourney | |
| 7,703,597 B2 | * | 4/2010 | Jansen | 198/415 |
| 7,971,701 B2 | | 7/2011 | Fourney | |
| 2006/0070855 A1 | | 4/2006 | Lemm | |
| 2010/0108468 A1 | * | 5/2010 | Fourney | 198/617 |
| 2010/0300836 A1 | * | 12/2010 | Fourney et al. | 198/416 |
| 2011/0022221 A1 | * | 1/2011 | Fourney | 700/230 |
| 2011/0056807 A1 | * | 3/2011 | Fourney | 198/779 |

FOREIGN PATENT DOCUMENTS

KR 1020100058148 A 6/2010
WO 2012078112 A2 6/2012

OTHER PUBLICATIONS

International Search Report and Written Opinion of the International Searching Authority, PCT/US2014/054016, mailed Dec. 10, 2014, Korean Intellectual Property Office, Republic of Korea.

* cited by examiner

Primary Examiner — Mark A Deuble
(74) Attorney, Agent, or Firm — Catherine M. Bishop

(57) ABSTRACT

A sorting conveyor employs suction to stabilize products on a conveyor belt. The sorting conveyor comprises a conveyor belt including a plurality of embedded rollers for moving conveyed objects relative to the conveyor belt. A vacuum chamber below the conveyor belt houses activators for the rollers and selectively creates a vacuum zone above the conveyor belt for pulling objects on the conveyor belt.

12 Claims, 2 Drawing Sheets

CONVEYOR EMPLOYING A VACUUM

BACKGROUND

The invention relates generally to power-driven conveyors and, more particularly, to a conveyor that employs a vacuum to facilitate conveyance.

Conveyor belts may sometimes include article-supporting rollers to propel conveyed objects in a desired direction as the conveyor belt advances. Conveyor belts with article-supporting rollers may be used for accelerating, diverting, sorting, merging, switching or otherwise moving objects in a selected direction relative to a moving conveyor belt. The rollers are arranged to rotate in line with or perpendicular or oblique to the direction of belt travel. Examples of conveyors using belts of this kind are described in, for example, U.S. Pat. Nos. 6,494,312; 6,968,941; 7,461,739; and 7,971,701.

Conveyed objects may be unsteady on conveyor belts, particularly due to the use of embedded rollers, which may cause the objects to shift or fall.

SUMMARY

A sorting conveyor employs suction to stabilize products on a conveyor belt employing article-supporting rollers. The sorting conveyor includes at least one vacuum chamber housing activators for the rollers in the conveyor belt. Each vacuum chamber is coupled to a vacuum generator, which selectively generates a vacuum in the associated vacuum chamber to pull articles being conveyed against the conveyor belt. A control system may be used to selectively operate a selected vacuum generator when a product is in an associated vacuum zone.

According to one aspect, a sorting conveyor comprises a conveyor belt having a plurality of rollers, a vacuum chamber disposed below the conveyor belt, the vacuum chamber connected to a vacuum generator to create a vacuum zone in a select area above the conveyor belt and a controller for selectively operating the vacuum generator when a conveyed object is in the vacuum zone.

In another aspect, a sorting conveyor comprises an array of vacuum chambers, each vacuum chamber connected to a vacuum generator, an array of activators for selectively activating one or more rollers in a conveyor belt, each vacuum chamber housing a set of activators and a conveyor belt traveling over the series of vacuum chambers. The conveyor belt comprises a plurality of rollers, with at least one roller in contact with an activator.

According to another aspect, a method of conveying objects using a conveyor comprises the steps of conveying an object on a conveyor belt through a plurality of vacuum zones, the conveyor belt comprising an array of rollers, and generating a vacuum in a selected vacuum zone when the object enters the selected vacuum zone.

BRIEF DESCRIPTION OF THE DRAWINGS

The disclosed systems and methods can be understood with reference to the following drawings. The components in the drawings are not necessarily to scale.

DETAILED DESCRIPTION

A sorting conveyor employs the use of a vacuum to stabilize conveyed objects. The invention will be described below relative to certain illustrative embodiments, though the invention is not limited to the illustrative embodiments.

Figure 1:
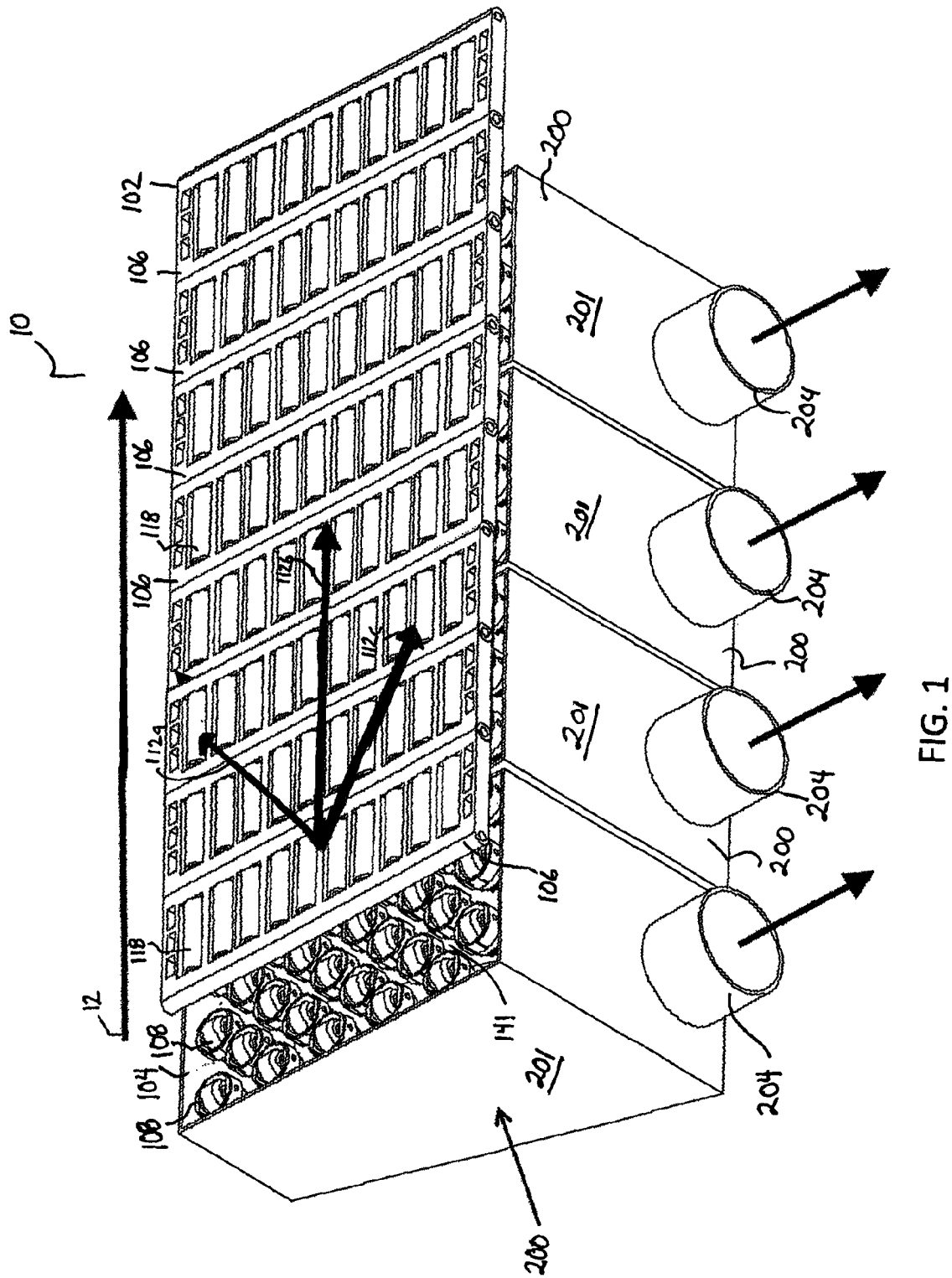
FIG. 1 is a perspective view of a section of a sorting conveyor employing a vacuum according to an illustrative embodiment of the invention.
Figure 2:
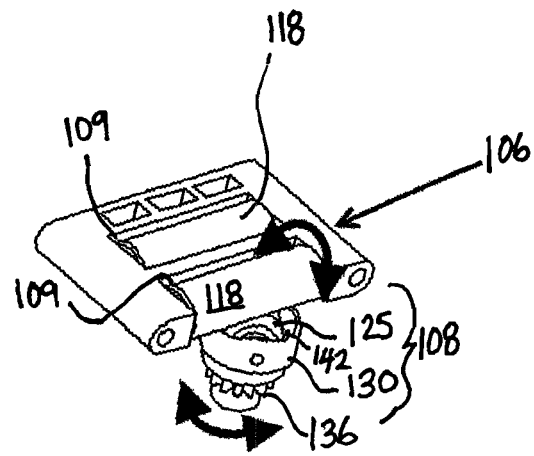
FIG. 2 is a detailed, cross-sectional view of an actuator and conveyor belt module of the sorting conveyor of FIG. 1.

FIG. 1 illustrates a sorting conveyor 10 according to an illustrative embodiment of the invention. The sorting conveyor 10 comprises a conveyor belt 102 traveling in a travel direction indicated by arrow 12. The conveyor belt includes embedded rollers 118, which are longitudinally oriented in the illustrative embodiment. The conveyor belt may comprise a plurality of conveyor belt modules 106 hingedly connected together. An array of activators, illustrated as field 104 of angularly adjustable drive roller modules 108 is disposed below the conveyor belt a sorting region. Each roller module 108 may comprise a free-spinning drive roller 125 mounted in a cartridge 130. The cartridge 130 may include teeth 136, shown in FIG. 2, used to orient the activator. The conveyor belt and activators may be same or similar to the system described in U.S. Pat. No. 7,971,701, the contents of which are incorporated herein by reference.

The activators 108 may be selectively oriented and actuated to move product in a selected direction, indicated by arrows 112a, 112b and 112c, relative to the conveyor belt.

Each module includes spaces 109 between the rollers 118 and the module body 106. The module may include other openings extending from the top surface of the module to the bottom surface, as well.

The array of activators 104 may include spaces 141 between the cartridges 108 and spaces 142 between the cartridges 130 and driver rollers 125.

The sorting conveyor 10 employs a vacuum to stabilize conveyed articles on the conveyor belt 102. In one embodiment, the sorting conveyor 10 includes one or more vacuum chambers 200 housing the activators 104 and arranged in series. Each vacuum chamber is a sealed box comprising side walls 201 and an open top. A set of activators 104 is housed within the side walls 201 of each vacuum chamber 200. The conveyor belt 102 rides over the open tops of the vacuum chambers. Each vacuum chamber further includes a connector 204 in a side wall for connecting the vacuum chamber 200 to a vacuum generator. A vacuum generator (not shown) is connected to each vacuum chamber 200 to create a vacuum zone above each vacuum chamber. Each vacuum zone may be segregated from the other vacuum zones.

The vacuum generated by the vacuum generator may pull articles being conveyed against the belt 102 to provide stability. The vacuum may be applied to the conveyed articles during straight conveyance, switching, sorting, and-or transitions on and off of the conveyor belt 102.

In one embodiment, the vacuum is a continuous air flow. In another embodiment, the vacuum may be controlled in different regions. For example, each vacuum chamber may be selectively actuated to create a vacuum in a selected vacuum zone.

Figure 3:
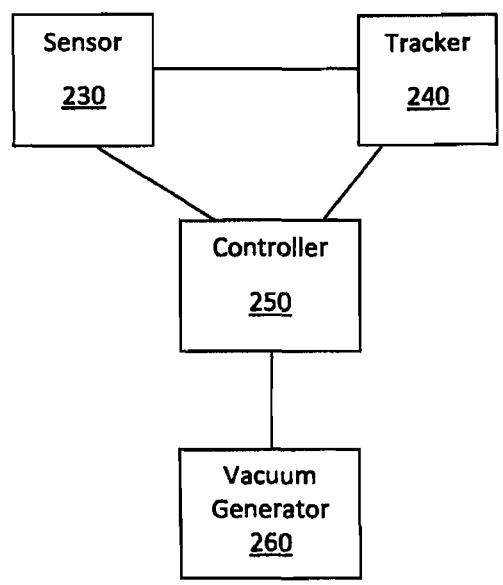
FIG. 3 is a block diagram showing the relationship between a sensor, tracker, vacuum generator and controller for the vacuum generator according to one embodiment of the invention.

Referring to FIG. 3, to perform selective actuation of a vacuum zone, the sorting conveyor 10 may include a sensor 230 for sensing of an article of conveyance. The sensor 230 may be a photoelectric sensor or any other suitable sensor known in the art. The sensor may sense the initial positioning of the product. A tracker 240, such as an encoder, may track the location of the conveyed article along the conveying surface.

Information from the sensor 230 and tracker 240 is fed to a controller 250 for a vacuum generator 260. Based on the information, the controller may selectively activate a vacuum generator for each vacuum zone. The vacuum generator may generate a vacuum only when a conveyed object is in the vacuum zone and turn the vacuum off when the article exits the vacuum zone. The selective operation of the vacuum conserves energy and resources.

Alternatively, the controller 250 may use information regarding the location of a conveyed object to selectively connect a vacuum chamber 200 to a vacuum generator when it is desirable to create a vacuum in the vacuum zone above the vacuum chamber, and disconnect the vacuum chamber from the vacuum generator when suction is not necessary or desirable in the vacuum zone.

What is claimed is:

1. A sorting conveyor, comprising:
    a conveyor belt comprising a plurality of rollers;
    a first vacuum chamber disposed below the conveyor belt, the vacuum chamber connected to a first vacuum generator to create a first vacuum zone in a first area above the conveyor belt;
    a second vacuum chamber disposed below the conveyor belt, the second vacuum chamber connected to a second vacuum generator to create a second vacuum zone in a second area above the conveyor belt, the second vacuum chamber segregated from the first vacuum chamber;
    a sensor for sensing the location of a conveyed object; and
    a controller for selectively operating the first vacuum generator when a conveyed object carried by a first roller on the conveyor belt is in the first vacuum zone and for operating the second vacuum generator when the conveyed object and first roller are in the second vacuum zone, based on information from the sensor.

2. The sorting conveyor of claim 1, further comprising:
    an array of activators for activating the rollers, the array of activators housed within the vacuum chamber.

3. The sorting conveyor of claim 1, wherein the first vacuum chamber and second vacuum chamber each comprise a sealed box having side walls and an open top.

4. The sorting conveyor of claim 1, further comprising a tracker for tracking a conveyed object sensed by the sensor, wherein the controller uses the information from the tracker to selectively operate the vacuum generator.

5. The sorting conveyor of claim 1, wherein the first vacuum chamber includes a connector in a side wall connected to the first vacuum generator.

6. The sorting conveyor of claim 5, further comprising an array of activators in the first vacuum chamber for activating the rollers of the conveyor belt, the array of activators located between the conveyor belt and the connector.

7. A sorting conveyor, comprising:
    an array of vacuum chambers, each vacuum chamber connected to a vacuum generator and segregated from the other vacuum chambers;
    an array of activators for selectively activating one or more rollers in a conveyor belt, each vacuum chamber housing a set of activators;
    a conveyor belt traveling over the series of vacuum chambers, the conveyor belt comprising a plurality of rollers, with at least one roller in contact with an activator;
    a sensor for sensing the location of a conveyed object on the conveyor belt;
    a tracker for tracking the conveyed object on the conveyor belt; and
    a controller for selectively operating a vacuum generator associated with a vacuum chamber when a conveyed object is determined to be in a vacuum zone above the vacuum chamber based on information from the sensor and tracker.

8. The sorting conveyor of claim 7, wherein the vacuum chambers are arranged in series along a conveying direction of the conveyor belt.

9. The sorting conveyor of claim 7, wherein each vacuum chamber includes a connector in a side wall connected to a vacuum chamber, the connector disposed below the array of activators.

10. A method of conveying objects using a conveyor, comprising the steps of:
    conveying an object on a conveyor belt through a plurality of vacuum zones, the conveyor belt comprising an array of rollers;
    sensing the presence of a conveyed object in a first vacuum zone;
    generating a vacuum in the first vacuum zone when the object enters the first vacuum zone; and
    stopping the vacuum when the object leaves the first vacuum zone.

11. The method of claim 10, wherein each vacuum zone is formed by a vacuum chamber below the conveyor belt housing an array of activators for activating select rollers in the conveyor belt.

12. The method of claim 10, further comprising the step of generating a vacuum in a second vacuum zone when the object enters the second vacuum zone.

* * * * *